United States Patent
Kawashima

(10) Patent No.: US 7,240,555 B2
(45) Date of Patent: Jul. 10, 2007

(54) ULTRASONIC SENSOR ASSEMBLY

(75) Inventor: Yasuhiro Kawashima, Okazaki (JP)

(73) Assignee: DENSO Corporation, Kariya (JP)

( * ) Notice: Subject to any disclaimer, the term of this patent is extended or adjusted under 35 U.S.C. 154(b) by 106 days.

(21) Appl. No.: 11/194,652

(22) Filed: Aug. 2, 2005

(65) Prior Publication Data

US 2006/0021440 A1    Feb. 2, 2006

(30) Foreign Application Priority Data

Aug. 2, 2004    (JP)    ............... 2004-225828

(51) Int. Cl.
*G01S 15/93* (2006.01)

(52) U.S. Cl. ............ 73/632; 340/435; 340/693.9; 367/99

(58) Field of Classification Search ............ 73/632, 73/866.5; 367/99; 340/435, 693.9
See application file for complete search history.

(56) References Cited

U.S. PATENT DOCUMENTS

| | | | |
|---|---|---|---|
| 6,227,501 B1 | 5/2001 | Malcolm | |
| 6,282,969 B1 * | 9/2001 | Daniel | ............ 73/866.1 |
| 6,318,774 B1 | 11/2001 | Karr et al. | |
| 6,759,950 B2 | 7/2004 | Nishimoto et al. | |
| 2004/0077213 A1 | 4/2004 | Sakiyama et al. | |

FOREIGN PATENT DOCUMENTS

| | | |
|---|---|---|
| JP | A-2000-341795 | 12/2000 |
| JP | A-2001-63497 | 3/2001 |
| JP | A-2001-66359 | 3/2001 |
| JP | A-2002-71789 | 3/2002 |
| JP | A-2003-312232 | 11/2003 |

* cited by examiner

*Primary Examiner*—John E. Chapman
(74) *Attorney, Agent, or Firm*—Posz Law Group, PLC

(57) ABSTRACT

Engaging portions of an ultrasonic sensor apparatus are engaged with engaging portions of a holding member at a first angular position of the ultrasonic sensor apparatus when the ultrasonic sensor apparatus is axially installed to the holding member, which is in turn installed to a bumper. At the time of uninstalling the sensor apparatus from the holding member, one of the engaging portions is radially outwardly disengaged from a corresponding one of the engaging portions of the holding member, and then the sensor apparatus is rotated to a second angular position to release engagement between the rest of the engaging portions of the sensor apparatus and the rest of the engaging portions of the holding member. Thereafter, the sensor apparatus is axially pulled away from the holding member to uninstall the sensor apparatus from the holding member.

7 Claims, 8 Drawing Sheets

ULTRASONIC SENSOR ASSEMBLY

CROSS REFERENCE TO RELATED APPLICATION

This application is based on and incorporates herein by reference Japanese Patent Application No. 2004-225828 filed on Aug. 2, 2004. This application is also related to U.S. Patent Application Ser. No. 11/194,656 filed simultaneously on Aug. 2, 2005 with the present application and entitled "Ultrasonic Sensor Assembly."

BACKGROUND OF THE INVENTION

1. Field of the Invention

The present invention relates to an ultrasonic sensor assembly, which is installed to an installation object, such as a bumper of a vehicle, to sense presence of an obstacle.

2. Description of Related Art

A structure for installing an ultrasonic sensor apparatus, which senses presence of an obstacle, to a bumper of a vehicle is recited in Japanese Unexamined Patent Publication Number 2001-527480 (corresponding to U.S. Pat. No. 6,318,774).

In Japanese Unexamined Patent Publication Number 2001-527480, a through hole is formed through the bumper, and a holding member is secured to an opening edge of the through hole on an inner surface side of the bumper by, for example, welding. The holding member is formed into a tubular body, which receives the ultrasonic sensor apparatus (module) to form a sensor assembly. Furthermore, in order to limit sliding movement of the ultrasonic sensor apparatus in an axial direction of a sensing axis, engaging portions (projections), which project toward the holding member, are formed in the ultrasonic sensor apparatus, and engaging portions (grooves), which engage the engaging portions, respectively, of the ultrasonic sensor apparatus, are formed in the holding member. The engaging portions of the ultrasonic sensor apparatus and the engaging portions of the holding member form clip devices. Thus, the ultrasonic sensor apparatus is secured to the bumper through the holding member.

In the structure of Japanese Unexamined Patent Publication Number 2001-527480, the holding member, which includes the engaging portions, is resiliently deformably formed. Thus, the engagement between the engaging portions of ultrasonic sensor apparatus and the engaging portions of the holding member can be released by lifting the holding member, and thereby the ultrasonic sensor apparatus can be removed from the holding member.

However, in order to secure the ultrasonic sensor apparatus, the multiple clip devices (the multiple engaging portions of the ultrasonic sensor apparatus and the multiple engaging portions of the holding member) are formed. Thus, at the time of removing the ultrasonic sensor apparatus from the holding member, the multiple parts of the holding member, in which the engaging portions are provided, need to be lifted at once. Furthermore, since the holding member is formed into the tubular body, the multiple parts of the holding member, in which the engaging portions are provided, cannot be easily lifted. That is, the removal of the ultrasonic sensor apparatus cannot be performed smoothly. For example, at the time of manually removing the ultrasonic sensor apparatus from the holding member, it is difficult to remove the ultrasonic sensor apparatus by a single hand of an operator.

SUMMARY OF THE INVENTION

The present invention addresses the above disadvantages. Thus, it is an objective of the present invention to provide an ultrasonic sensor assembly, which includes an ultrasonic sensor apparatus and which facilitates releasing of the ultrasonic sensor apparatus from a holding member.

To achieve the objective of the present invention, there is provided an ultrasonic sensor assembly that is installable to a through hole of an installation object, which extends from a first surface to a second surface of the installation object. The ultrasonic sensor assembly includes an ultrasonic sensor apparatus and a holding member. The ultrasonic sensor apparatus includes a sensor arrangement and a housing. The sensor arrangement is held by the housing and is received in the through hole of the installation object upon installation of the ultrasonic sensor assembly to the installation object. The holding member holds the ultrasonic sensor apparatus relative to the installation object. The holding member is configured such that at least a portion of the holding member protrudes from the second surface of the installation object upon installation of the holding member to the installation object. One of the housing of the ultrasonic sensor apparatus and the holding member includes a plurality of first side engaging portions and at least one pass-through portion. The other one of the housing of the ultrasonic sensor apparatus and the holding member includes a plurality of second side engaging portions, which are engaged with the plurality of first side engaging portions, respectively, upon installation of the ultrasonic sensor apparatus to the holding member. A first one of the plurality of first side engaging portions and a corresponding first one of the plurality of second side engaging portions limit both an axial movement and a rotational movement of the ultrasonic sensor apparatus relative to the holding member when the first one of the plurality of first side engaging portions is engaged with the corresponding first one of the plurality of second side engaging portions in a first angular position of the ultrasonic sensor apparatus upon the installation of the ultrasonic sensor apparatus to the holding member. The first one of the plurality of first side engaging portions and the corresponding first one of the plurality of second side engaging portions are disengageable from one another in the first angular position of the ultrasonic sensor apparatus. The rest of the plurality of first side engaging portions and the rest of the plurality of second side engaging portions limit the axial movement of the ultrasonic sensor apparatus relative to the holding member when the rest of the plurality of first side engaging portions is engaged with the rest of the plurality of second side engaging portions in the first angular position of the ultrasonic sensor apparatus upon the installation of the ultrasonic sensor apparatus to the holding member. Each of the at least one pass-through portion is positioned next to a corresponding one of the rest of the plurality of first side engaging portions in a circumferential direction of the ultrasonic sensor apparatus. The rest of the plurality of first side engaging portions and the rest of the plurality of second side engaging portions are disengageable from one another at a second angular position of the ultrasonic sensor apparatus, which is spaced from the first angular position in the circumferential direction of the ultrasonic sensor apparatus, to enable the axial movement of the ultrasonic sensor apparatus relative to the holding member in such a manner that each of the rest of the plurality of second side engaging portions passes through a corresponding one of the at least one pass-through portion.

To achieve the objective of the present invention, there is also provided an ultrasonic sensor assembly that is installable to a through hole of an installation object, which extends from a first surface to a second surface of the installation object. The ultrasonic sensor assembly includes an ultrasonic sensor apparatus and a holding member. The ultrasonic sensor apparatus includes a sensor arrangement and a housing. The sensor arrangement is held by the housing and is received in the through hole of the installation object upon installation of the ultrasonic sensor assembly to the installation object. The holding member holds the ultrasonic sensor apparatus relative to the installation object. The holding member is configured such that at least a portion of the holding member protrudes from the second surface of the installation object upon installation of the holding member) to the installation object. One of the housing of the ultrasonic sensor apparatus and the holding member includes a plurality of first side engaging portions. The other one of the housing of the ultrasonic sensor apparatus and the holding member includes a plurality of second side engaging portions, which are engaged with the plurality of first side engaging portions, respectively, upon installation of the ultrasonic sensor apparatus to the holding member. At least one of the plurality of second side engaging portions is radially inwardly slanted from a radially outer top thereof toward both of a leading end and a trailing end thereof to have a leading side slant surface and a trailing side slant surface.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings. In the present embodiment, there will be described a case where an ultrasonic sensor assembly is installed to a bumper of a vehicle.

The ultrasonic sensor assembly includes an ultrasonic sensor apparatus and a holding member for holding and securing the same relative to the bumper.

Figure 1A:
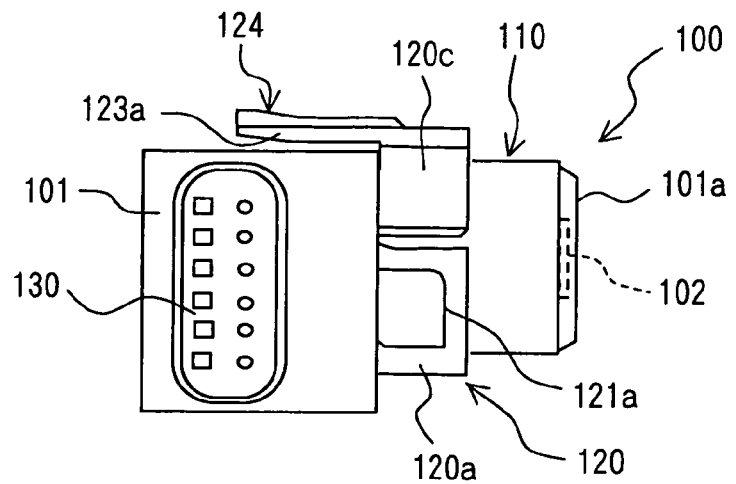
FIG. 1A is a side view of an ultrasonic sensor apparatus of an ultrasonic sensor assembly according to an embodiment of the present invention.
Figure 1B:
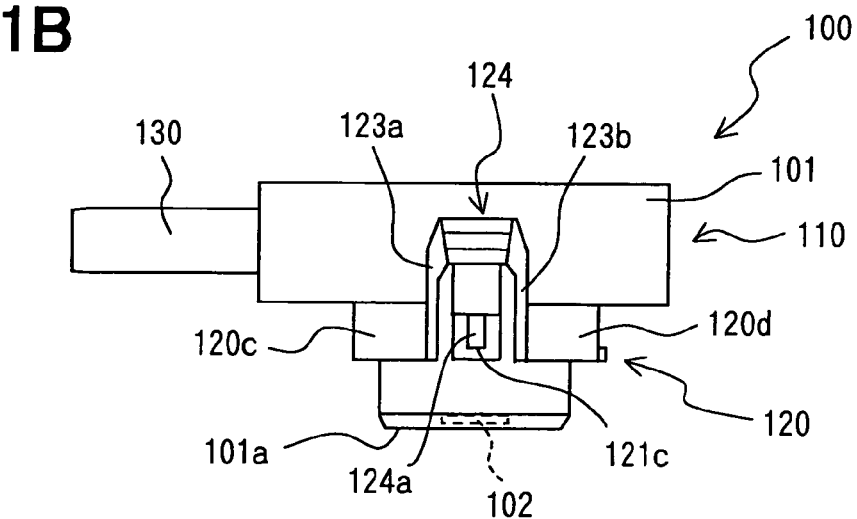
FIG. 1B is a top view of the ultrasonic sensor apparatus depicted in FIG. 1A.
Figure 1C:
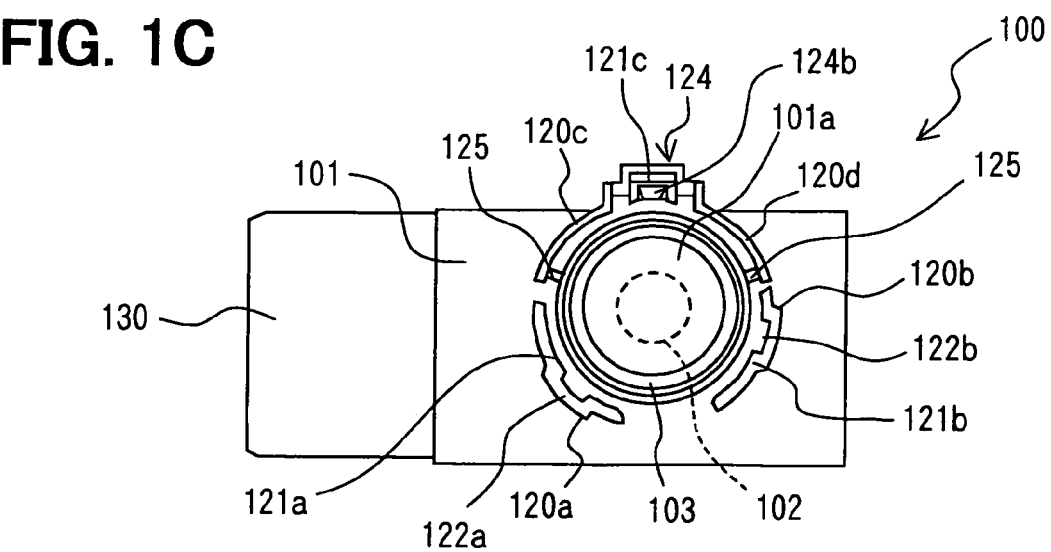
FIG. 1C is a right side view of the ultrasonic sensor apparatus depicted in FIG. 1A.

Specifically, FIGS. 1A-1C schematically show a structure of the ultrasonic sensor apparatus, which is used as a back sonar or a corner sonar. More specifically, FIG. 1A is a side view of the ultrasonic sensor apparatus. FIG. 1B is a top view of the ultrasonic sensor apparatus depicted in FIG. 1A. FIG. 1C is a right side view of the ultrasonic sensor apparatus depicted in FIG. 1A. In the following description, the characteristic structure (also referred to as an ultrasonic sensor installation structure) of the ultrasonic sensor assembly, which is used to install the same to the bumper, will be mainly described. Known components may be used as other components other than those of the installation structure.

As illustrated in FIGS. 1A to 1C, the ultrasonic sensor apparatus 100 includes a sensor arrangement 110. A housing 101, which holds the sensor arrangement 110, is made of, for example, polybutylene terephthalate (PBT). An aluminum microphone is secured to a distal end of the housing 101, in such a manner that an outer surface of a bottom wall of the microphone forms a distal end surface 101a of he housing 101, and a piezoelectric vibrator 102 (indicated by a dotted line in FIGS. 1A to 1C) is bonded or joined to an inner surface of the bottom wall of the microphone. The ultrasonic sensor apparatus 100 of the present embodiment is constructed as follows. A portion of the sensor arrangement 110 is inserted into a through hole 301 of a bumper (installation object) 300 (see, for example, FIGS. 4A-4B), which extends from an outer surface (first surface) to an inner surface (second surface) of the bumper 300 from an inner surface side of the bumper 300. Thus, the distal end surface 101a is placed at a distal end of the ultrasonic sensor apparatus 100. A portion of the ultrasonic sensor apparatus 100, which extends from the distal end surface 101a and is received in a holding member 200 (described in greater detail below), is formed into a generally cylindrical shape.

The piezoelectric vibrator 102 is electrically connected to a circuit (not shown) through lead lines in the housing 101 of the sensor arrangement 110. The distal end surface 101a, which has a generally circular shape and forms a diaphragm, is vibrated by the piezoelectric vibrator 102 to generate ultrasonic waves. The generated ultrasonic waves are directed toward, for example, an obstacle and are reflected by the obstacle. Then, the reflected ultrasonic waves are received by the piezoelectric vibrator 102, and the obstacle is sensed based on the received ultrasonic waves. Numeral 103 indicates a vibration absorber, which is made of a resilient material, such as rubber. The microphone is secured to the housing 101 through the vibration absorber 103.

The ultrasonic sensor apparatus 100 includes a securing base 120. The securing base 120 is located radially outward of the sensor arrangement 110 in such a manner that a sensing axis of the piezoelectric vibrator 102 of the sensor arrangement 110 forms a center (a central axis) of the securing base 120. Furthermore, the securing base 120 protrudes from the housing 101 in a direction generally parallel to the generally cylindrical portion of the sensor arrangement 110. The securing base 120 receives the holding member 200 described below. The securing base 120 includes engaging portions (female engaging portions or first side engaging portions) 121a-121c, to which engaging portions (male engaging portions or second side engaging portions) 223a-223c of the holding member 200 described below are engaged in a first angular position of the ultrasonic sensor apparatus 100.

In the present embodiment, the securing base 120 is formed integrally with the housing 101 from the same common material. The securing base 120 is divided into four segments 120a-120d, which are arranged along an imaginary circle that is coaxial with the sensing axis of the piezoelectric vibrator 102.

Each of the segments 120a, 120b is formed into an arch-like body. More specifically, each of the segments 120a, 120b has two legs that protrude axially from the housing 101 and are connected together by a connection, to which a corresponding one of the engaging portions 223a, 223b of the holding member 200 is engaged. Specifically, the connections of the segments 120a, 120b form the engaging portions 121a, 121b, respectively.

Furthermore, each of the segments 120a, 120b includes a pass-through section 122a, 122b. The pass-through section 122a, 122b is arranged adjacent to or next to an engaging point of the corresponding engaging portion 223a, 223b of the holding member 200 in the circumferential direction, and the corresponding engaging portion 223a, 223b of the holding member 200 is passable through the pass-through section 122a, 122b at the time of uninstalling the ultrasonic sensor apparatus 100 from the holding member 200. The pass-through section 122a, 122b is formed integrally with the corresponding engaging portion 121a, 121b. Furthermore, a radial distance between the pass-through section 122a, 122b and the sensing axis of the piezoelectric vibrator 102 is set to be longer than that of the adjacent engaging portion 121a, 121b and the sensing axis of the piezoelectric vibrator 102. In addition, the pass-through sections 122a, 122b of the segments 120a, 120b are equally spaced from the engaging points, respectively, of the corresponding engaging portions 223a, 223c of the holding member 200 in a common rotational direction about the sensing axis. Therefore, through the engagement with the engaging portions 223a, 223b of the holding member 200, the engaging portions 121a, 121b of the segments 120a, 120b limit the axial movement of the ultrasonic sensor apparatus 100. Also, when the ultrasonic sensor apparatus 100 is rotated about the sensing axis to a second angular position of the ultrasonic sensor apparatus 100, which is spaced from the first angular position in the circumferential direction of the ultrasonic sensor apparatus 100, the engagement between the engaging portions 223a, 223b of the holding member 200 and the engaging portions 121a, 121b of the segments 120a, 120b is released. The structure of each pass-through section 122a, 122b is not limited to the above one. For example, a portion of the engaging portion 121a, 121b may be cut to allow the release of the engagement between the engaging portion 121a, 121b of the segment 120a, 120b and the corresponding engaging portion 223a, 223b of the holding member 200. Furthermore, each pass-through section may be an open space between corresponding adjacent two 120a-120b or 120b-120d of the segments 120a-120d. In such a case, each corresponding segment 120a, 120b may have a single axially extending leg and a circumferentially extending engaging portion, which extends circumferentially from a distal end of the single leg and engages with the corresponding engaging portion 223a, 223b of the holding member 200.

Two elastically deformable cantilever beams 123a, 123b are integrally connected to the opposed circumferential ends, respectively, of the segments 120c, 120d. The cantilever beams 123a, 123b extend from the segments 120c, 120d in a direction, which is parallel to the sensing axis and is away from the distal end surface 110a. A support portion 124 is formed between the cantilever beams 123a, 123b in such a manner that the support portion 124 is formed integrally with and is supported by the cantilever beams 123a, 123b. The support portion 124 has a larger circumferential width and a greater rigidity in comparison to the cantilever beams 123a, 123b.

Furthermore, the support portion 124 extends from rear ends of the cantilever beams 123a, 123b (i.e., ends of the segments 120c, 120d, which are opposite from the connections of the segments 120c, 120d) toward the distal end surface 101a in the direction parallel to the sensing axis of the piezoelectric vibrator 102. An axial position of a distal end of the support portion 124 is generally the same as projecting ends of the segments 120c, 120d, which project from the housing 101. A thorough hole 124a is provided in the distal end of the support portion 124, so that the distal end of the support portion 124 forms the engaging portion 121c, to which the engaging portion 223c of the holding member 200 is engaged, i.e., is snap fitted. Here, the engaging portion 121c serves as a first one of the engaging portions 121a-121c of the housing 101 of the ultrasonic sensor apparatus 100, and the engaging portion 223c serves as a first one of the engaging portions 223a-223c of the holding member 200. A circumferential width of the through hole 124a, which is measured in the rotational direction of the ultrasonic sensor apparatus 100) is set to be generally the same as or slightly greater than a circumferential width of the engaging portion 223c of the holding member 200 to limit chattering upon engagement between the engaging portion 121c and the engaging portion 223c. Thus, through the engagement with the engaging portion 223c of the holding member 200, the engaging portion 121c limits axial movement of the ultrasonic sensor apparatus 100 in the axial direction of the sensing axis and the rotational movement of the ultrasonic sensor apparatus 100 about the sensing axis.

Figure 2:
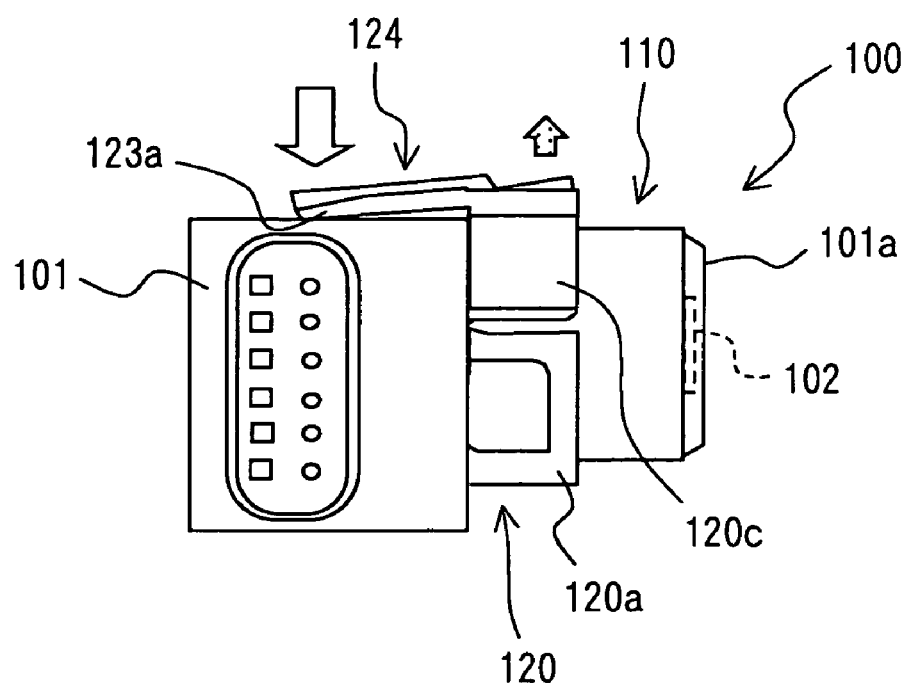
FIG. 2 is a descriptive view for describing releasing of engagement of an engaging portion of the ultrasonic sensor apparatus.

Furthermore, as shown in FIG. 2, when the rear end (left end in FIG. 2) of the support portion 124 is radially inwardly pushed, as indicated by a blank arrow in FIG. 2, the cantilever beams 123a, 123b are resiliently bent, so that the rear ends of the cantilever beams 123a, 123b are pushed radially inwardly toward the housing 101 while the connections between the cantilever beams 123a, 123b and the segments 120c, 120d serve as a fulcrum. Then, the distal end of the support portion 124, in which the engaging portion 121 is provided, is lifted radially outwardly from its engaged position, as indicated by a shaded arrow in FIG. 2. More specifically, when the support portion 124, which includes the engaging portion 121c, is pushed radially inwardly, the engagement between the engaging portion 121c of the support portion 124 and the engaging portion 223c of the holding member 200 is released. FIG. 2 is a descriptive view for describing releasing of the engagement of the engaging portion 121c and corresponds to FIG. 1A.

The support portion 124 includes a positioning portion 124b, which is provided in a predetermined range between the distal end of the support portion 124 and the through hole 124a while a portion of the positioning portion 124b is eliminated. At the time of installation, the positioning portion 124b positions and guides the engaging portion 223c of the holding member 200 to the through hole 124a, resulting in the engagement of the engaging portion 223c of the holding member 200 with the engaging portion 121c of the support portion 124. A depth of the positioning portion 124b increases toward its distal end. Furthermore, a width of the positioning portion 124b is greater than a width of the engaging portion 223c of the holding member 200 to provide a play therebetween. The positioning portion 124b extends obliquely at a predetermined angle, so that the positioning portion 124b can guide the engaging portion 223c of the holding member 200 to position it relative to the engaging portion 121c. In this way, the engaging portion 223c of the holding member 200 can be easily positioned relative to the support portion 124.

Furthermore, in the present embodiment, as shown in FIG. 1C, the engaging portions 121a-121c are generally uniformly distributed about the sensing axis of the piezoelectric vibrator 102. Thus, the ultrasonic sensor apparatus 100 can be stably secured to the holding member 200. In the drawings, stoppers are indicated by numeral 125, and a connector portion is indicated by numeral 130. The stoppers 125 limit a rotatable range of the ultrasonic sensor apparatus 100 at the time of rotating the ultrasonic sensor apparatus 100. The connecter portion 130 forms external electrical connection terminals.

Figure 3A:
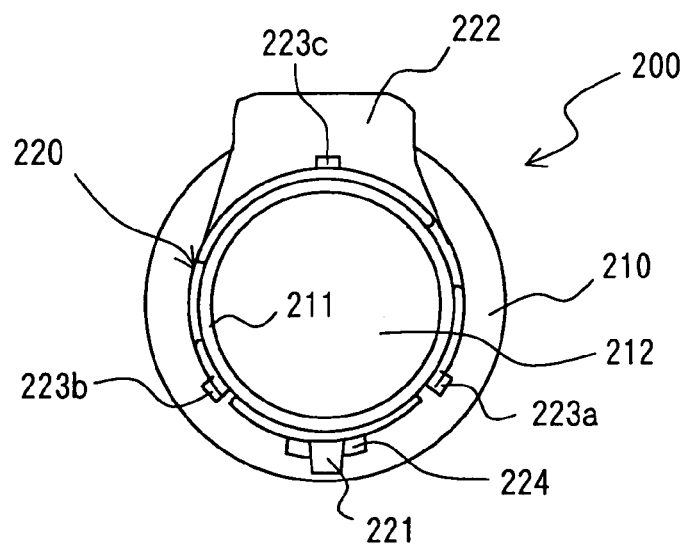
FIG. 3A is a plan view of a holding member of the ultrasonic sensor assembly seen from an installation side, from which the ultrasonic sensor apparatus is installed to the holding member.
Figure 3B:
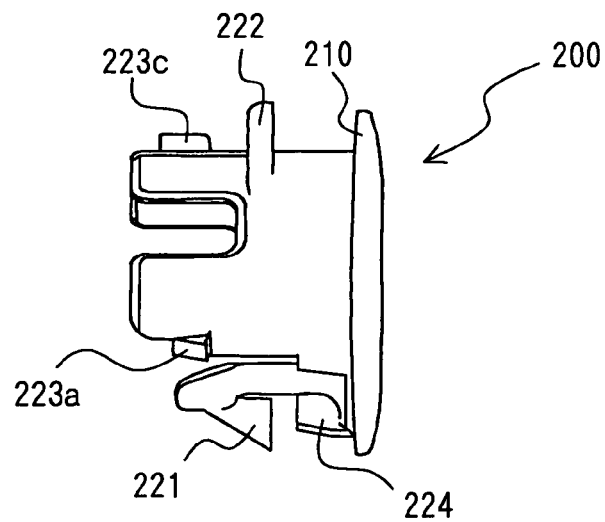
FIG. 3B is a right side view of the holding member depicted in FIG. 3A.
Figure 3C:
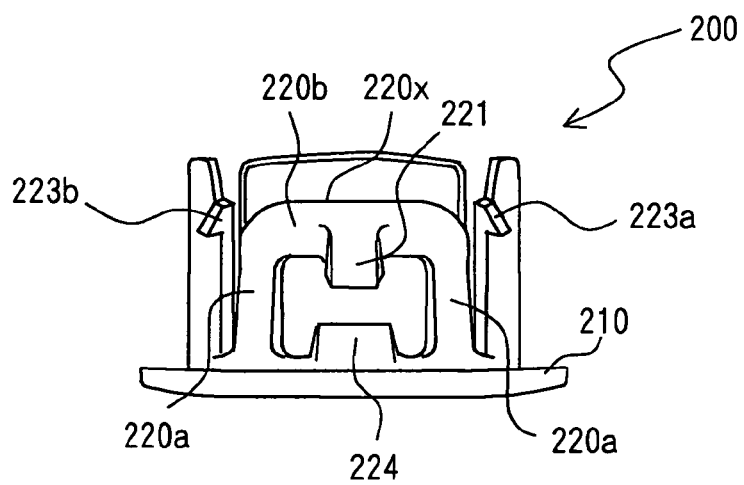
FIG. 3C is a bottom view of the holding member depicted in FIG. 3A.

Next, the holding member 200 will be described in greater detail with reference to FIGS. 3A-3C. FIGS. 3A-3C schematically show the structure of the holding member 200. More specifically, FIG. 3A is a plan view of the holding member 200 seen from an installation side, from which the ultrasonic sensor apparatus 100 is installed to the holding member 200. FIG. 3B is a right side view of the holding member 200 depicted in FIG. 3A. FIG. 3C is a bottom view of the holding member 200 depicted in FIG. 3A.

The holding member 200 is installed in the through hole 301 of the bumper 300 in such a manner that at least a portion of the holding member 200 projects from the through hole 301 on the back surface (the inner surface) side of the bumper 300 to receive the ultrasonic sensor apparatus 100.

The holding member 200 of the present embodiment includes a flange portion 210 and a tubular holding portion 220. The flange portion 210 engages an opening edge of the through hole 301 on the front surface (outer surface) side of the bumper 300. The holding portion 220 is connected to the flange portion 210. The holding portion 220 is received in the through hole 301 of the bumper 300, so that the holding portion 220 engages an inner peripheral wall of the through hole 301 and protrudes on the back surface (inner surface) side of the bumper 300.

The tubular section of the holding portion 220 receives the portion of the sensor arrangement 110 of the ultrasonic sensor apparatus 100, and the portion of the holding portion 220 is received in the securing base 120 of the ultrasonic sensor apparatus 100. Furthermore, at the time of rotating the ultrasonic sensor apparatus 100, the holding portion 220 contacts the stoppers 125 to limit the rotation of the ultrasonic sensor apparatus 100. Furthermore, the engaging portions 223a, 223b of the holding portion 220 are positionable relative to the pass-through sections 122a, 122b.

The holding portion 220 includes a claw (narrow claw) 221 and a wide claw 222, which protrude from the holding portion 220. The claw 221 is slanted or is tapered from its insertion end toward its projection apex. Here, the insertion end of the claw 221 is an end (a left end in FIG. 3B) of the claw 221 in an insertion direction of the claw 221 into the through hole 301. The projection apex of the claw 221 is an apex (a lower apex in FIG. 3B) of the claw 221. A space between the flange portion 210 and each of the claw 221 and the wide claw 222 is set to be generally the same as a width of the bumper 300, which is measured in the fore-and-aft direction of the vehicle. The holding member 200 is inserted into the through hole 301 of the bumper 300, and the flange portion 210 contacts the front surface side opening edge of the through hole 301. In this state, the bumper 300 is clamped between the flange portion 210 and each of the claw 221 and the wide claw 222, so that the holding member 200 is secured to the bumper 200. In the present embodiment, the wide claw 222 is shaped to correspond with the shape of the rear surface (the inner surface) of the bumper 300 to securely fix the holding member 200 relative to the bumper 300. However, similar to the claw 221, the wide claw 222 may be slanted or may be tapered from its insertion end toward its projection apex.

In the present embodiment, the holding portion 220 includes an arch-shaped section 220x, which has a plurality (two in the present embodiment) of protrusions 220a and a bridge 220b. The protrusions 220a axially protrude from the flange portion 210. Furthermore, the protrusions 220a extend through the through hole 301 and protrude on the rear surface side of the bumper 300. The protrusions 220a are bridged by the bridge 220b. The claw 221 is provided in the bridge 220b. Thus, at the time of securing the holding member 200 to the bumper 300, when the claw 221 is pushed into the through hole 301, the bridge 220b is bent, so that the stress, which is conducted to the protrusions 220a, is reduced. Since the multiple protrusions 220a are provided, the stress is spread over the protrusions 220a. Furthermore, with the above construction, a possibility of a damage to the protrusions 220a can be reduced at the time of inserting the holding portion 220 into the through hole 301.

The holding portion 220 includes the engaging portions 223a-223c, as discussed above. The engaging portions 223a-223c project from the holding portion 220 and are engaged with the engaging portions 121a-121c of the ultrasonic sensor apparatus 100. In the present embodiment, each of the engaging portions 223a, 223b is formed as a one-way snap fit fastener, which is slanted from the insertion end (an installation distal end) toward the projection apex. Since the support portion 124 has the slant surface, the engaging portion 223c is formed into a quadrangular prism like body. However, the shape of the engaging portion 223c may be modified into a form of a one-way fastener, like that of the engaging portions 223a, 223b. The engaging portion 223a corresponds to and is engaged with the engaging portion 121a, and the engaging portion 223b corresponds to and is engaged with the engaging portion 121b. Furthermore, the engaging portion 223c corresponds to and is engaged with the engaging portion 121c.

Numeral 211 indicates an inner flange, to which the ultrasonic sensor apparatus 100 is engaged. Also, numeral 212 indicates an opening, from which the distal end surface 101a of the ultrasonic sensor apparatus 100 is exposed. In addition, numeral 224 indicates an arch-shaped stabilizer, which is provided in the holding portion 220 to stabilize secure connection of the holding member 200 relative to the bumper 300.

Figure 4A:
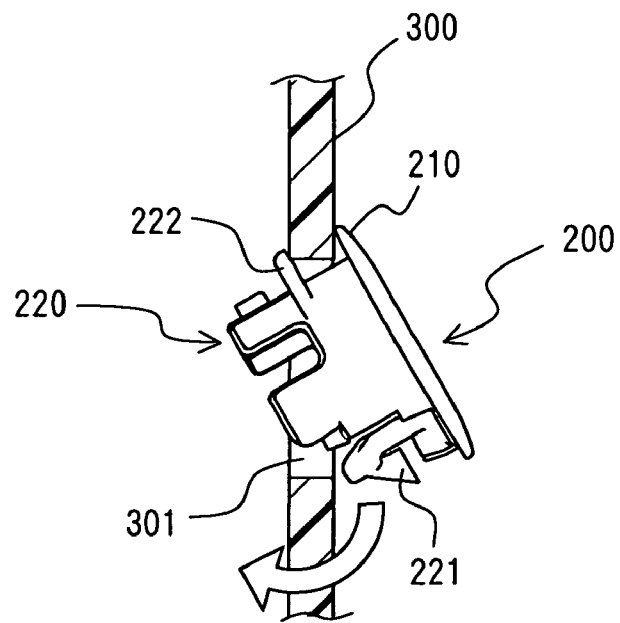
FIG. 4A is a diagram depicting fixation of the holding member to a bumper of a vehicle.
Figure 4B:
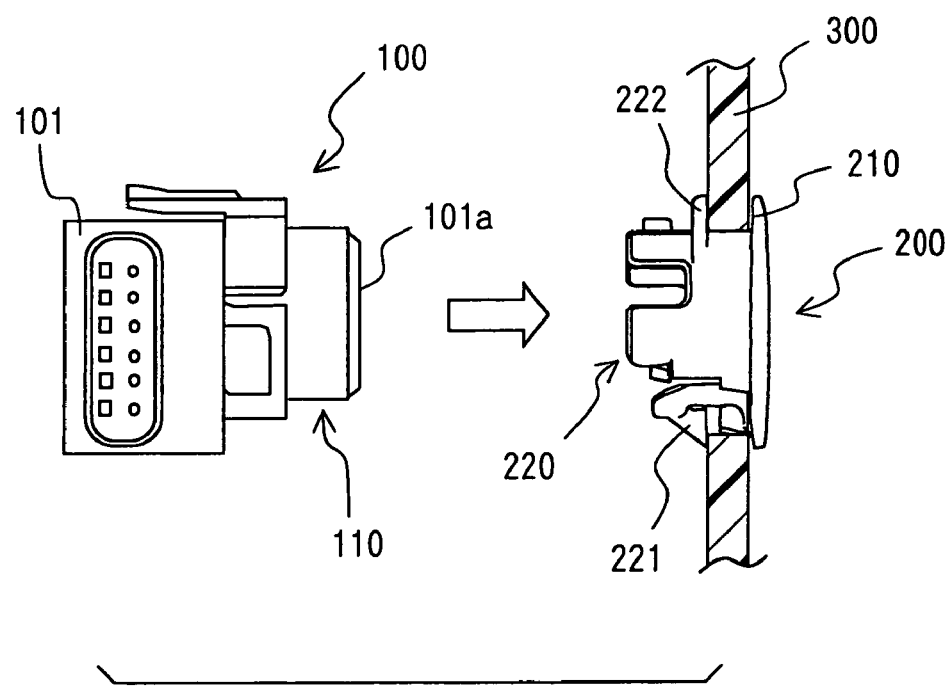
FIG. 4B is a diagram depicting fixation of the ultrasonic sensor apparatus to the holding member.
Figure 5A:
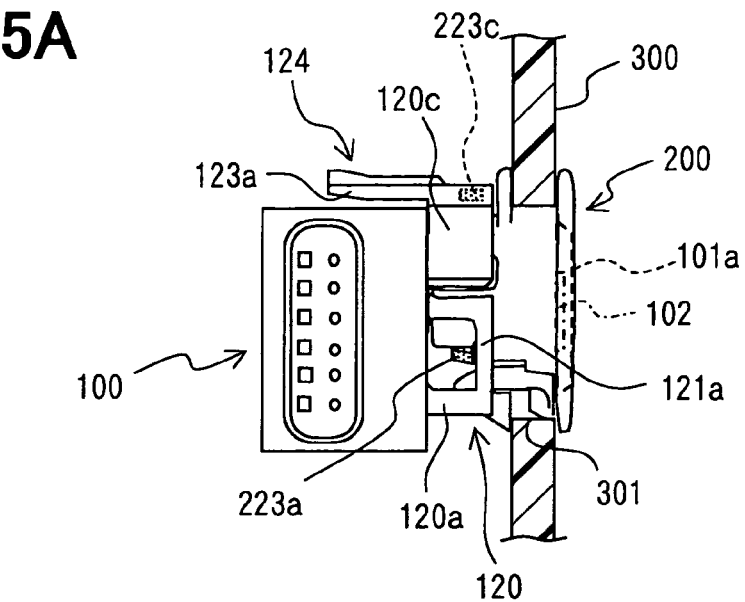
FIG. 5A is a partial cross sectional view of the ultrasonic sensor apparatus installed to the bumper.
Figure 5B:
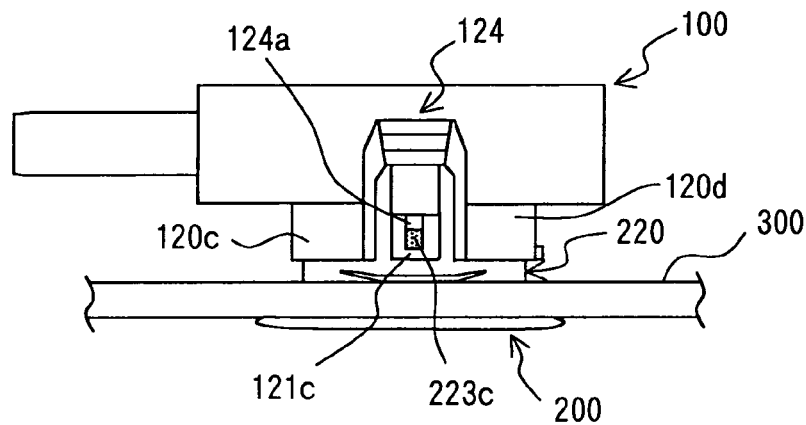
FIG. 5B is a top view of the ultrasonic sensor apparatus installed to the bumper in FIG. 5A.
Figure 5C:
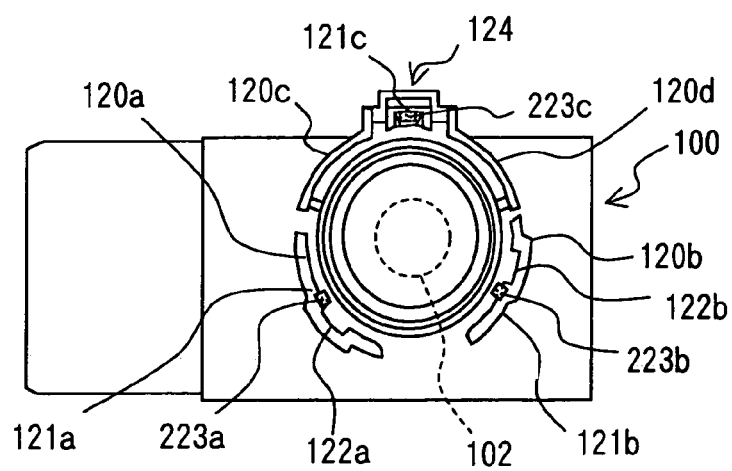
FIG. 5C is a diagram indicating an engaged state of a securing base of the ultrasonic sensor apparatus in FIG. 5A.

Next, with reference to FIGS. 4A-5C, the structure (installation structure) for installing the ultrasonic sensor apparatus 100 to the bumper 300 through use of the combination of the ultrasonic sensor apparatus 100 and the holding member 200 will be described. FIGS. 4A and 4B are diagrams for describing the installation method. More specifically, FIG. 4A depicts the fixation of the holding member 200 to the bumper 300, and FIG. 4B depicts the fixation of the ultrasonic sensor apparatus 100 to the holding member 200. FIGS. 5A to 5C are diagrams for indicating the installed state of the ultrasonic sensor apparatus 100 to the bumper 300. More specifically, FIG. 5A indicates a partial cross sectional view of the ultrasonic sensor apparatus 100 installed to the bumper 300. FIG. 5B is a top view of the ultrasonic sensor apparatus 100 installed to the bumper 300 in FIG. 5A. FIG. 5C is a diagram indicating the engaged state of the securing base 120 of the ultrasonic sensor apparatus 100 in FIG. 5A.

As shown in FIG. 4A, the holding member 200 is inserted into the through hole 301 of the bumper 300 on the front surface side of the bumper 300 in such a manner that the holding portion 220 serves as a leading end of the holding member 200 during the installation of the holding member 200 to the bumper 300. At this time, the wide claw 222 is passed first through the through hole 301. Then, while the wide claw 222 is engaged with the rear surface of the bumper 300, the holding portion 220 is pushed in a direction of a blank arrow in FIG. 4A. In this way, as shown in FIG. 4B, the holding member 200 is secured to the bumper 300 in such a manner that the bumper 300 is clamped between the flange portion 210 and each of the claw 221 and the wide claw 222, and the holding portion 220 engages the inner peripheral wall of the through hole 301. In this fixed state of the holding member 200, the ultrasonic sensor 100 is inserted into the through hole 301 of the bumper 300 in a direction of a blank arrow in FIG. 4B in such a manner that the distal end surface 101a serves as a leading end. Thus, the sensor arrangement 110 is received in the holding portion 220 of the holding member 200.

Therefore, the distal end surface 101a becomes generally flush with the outer surface of the holding member 200 and is exposed from the opening 212 of the holding member 200 in this state. Furthermore, a portion of the sensor arrangement 110 is received in the holding portion 220, and a portion of the holding portion 220 is received in the securing base 120 of the ultrasonic sensor apparatus 100. Furthermore, the engaging portions 223a-223c of the holding portion 220 of the holding member 200 are engaged with the engaging portions 121a-121c of the securing base 120 of the ultrasonic sensor apparatus 100. In this engaged state, the engaging portions 223a, 223b and the engaging portions 121a, 121b limit movement of the ultrasonic sensor apparatus 100 in the axial direction of the sensing axis. Furthermore, the engaging portion 223c and the engaging portion 122c limit movement of the ultrasonic sensor apparatus 100 in the axial direction of the sensing axis and also rotational movement of the ultrasonic sensor apparatus 100 about the sensing axis. In this way, as shown in FIGS. 5A-5C, the ultrasonic sensor apparatus 100 is installed to the bumper 300 through the holding member 200.

Figure 6A:
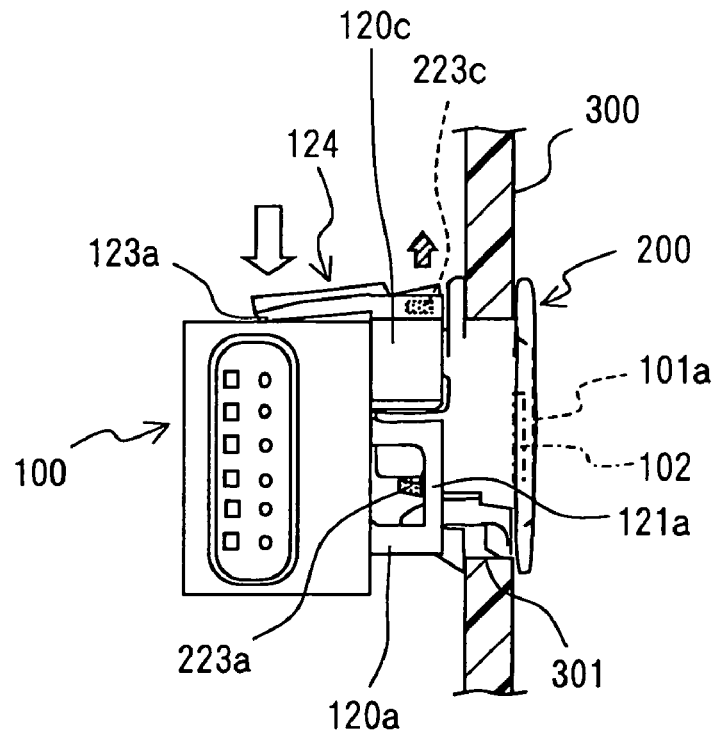
FIG. 6A is a partial cross sectional view showing release of engagement between an engaging portion of the holding member and the engaging portion of the ultrasonic sensor apparatus.
Figure 6B:
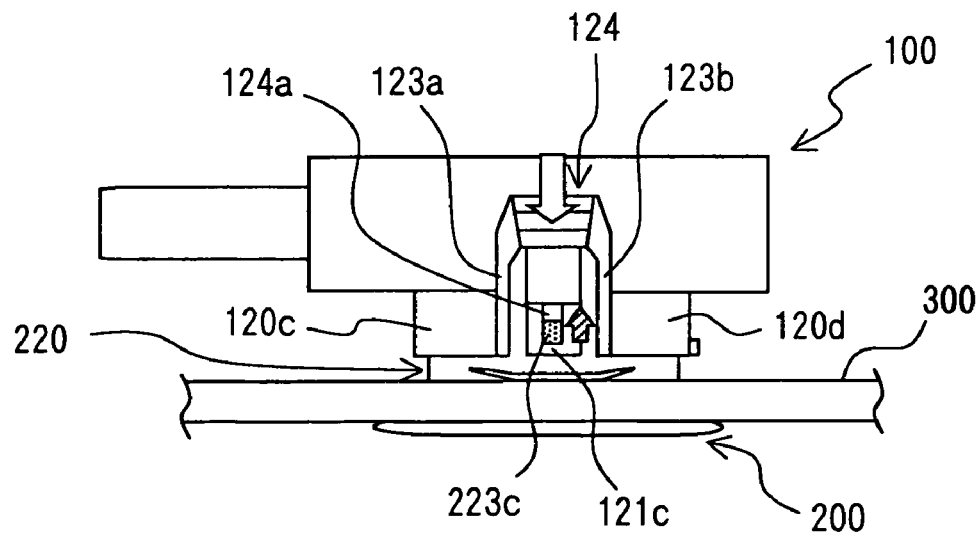
FIG. 6B is a plan view seen from a top side in FIG. 6A.
Figure 7A:
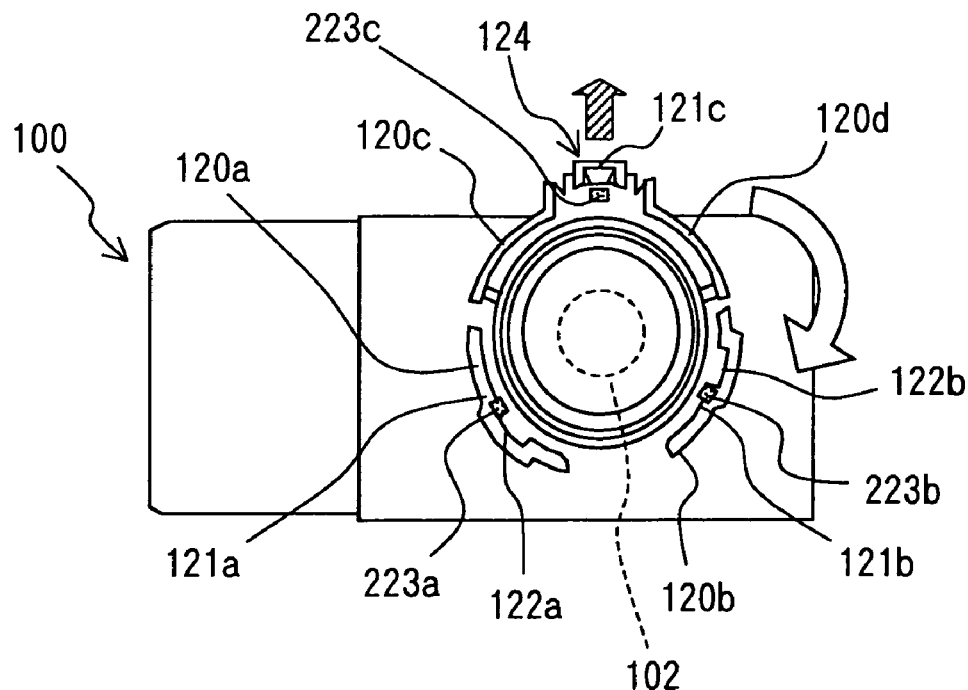
FIG. 7A is a diagram showing a state before rotation of the ultrasonic sensor apparatus relative to the holding member.
Figure 7B:
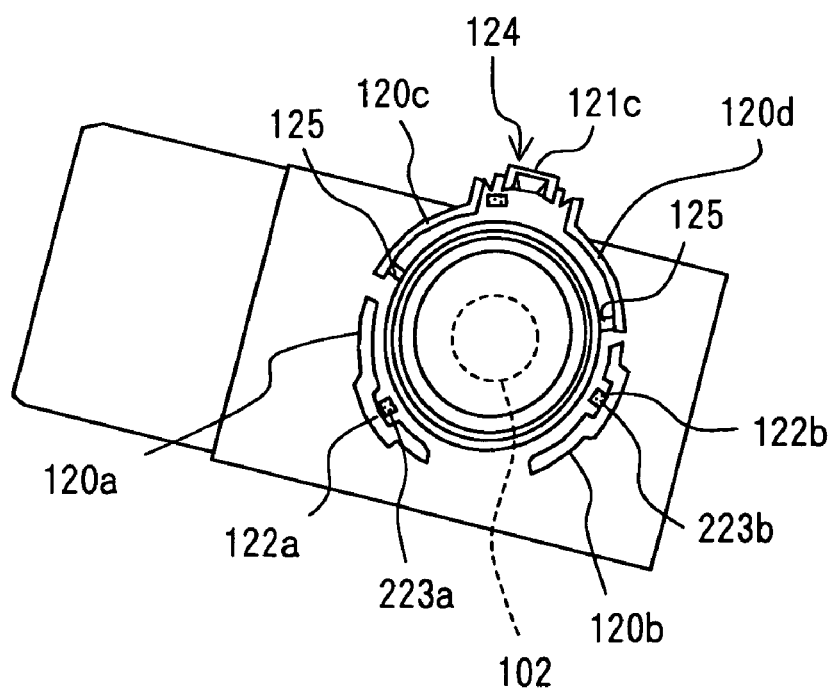
FIG. 7B is a diagram showing a sate after rotation of the ultrasonic sensor apparatus.

Next, removal of the ultrasonic sensor apparatus 100 from the holding member 200 will be described with reference to FIGS. 6A-7B. FIGS. 6A and 6B are diagrams for describing release of the engagement between the engaging portion 223c and the engaging portion 121c. More specifically, FIG. 6A is a partial cross sectional view showing the release of the engagement between the engaging portion 223c and the engaging portion 121c, and FIG. 6B is a plan view seen from a top side in FIG. 6A. FIGS. 7A and 7B are diagrams for describing release of the engagement between the engaging portions 223a, 223b and the engaging portions 121a, 121b. More specifically, FIG. 7A is a diagram showing a state before rotation of the ultrasonic sensor apparatus 100, and FIG. 7B is a diagram showing a sate after rotation of the ultrasonic sensor apparatus 100.

In the state shown in FIGS. 5A-5C, the engagement, which limits the rotational movement of the ultrasonic sensor apparatus 100, is released first. With reference to FIGS. 6A and 6B, at the beginning, the rear end of the support portion 124, which is provided in the securing base 120 of the ultrasonic sensor apparatus 100, is pushed in a direction of a blank arrow. In this way, as discussed above, the rear ends of the cantilever beams 123a, 123b are pushed downward, and the cantilever beams 123a, 123b are resiliently flexed. Thus, the distal end of the support portion 124 is lifted upward in a direction of a shaded arrow from the engaged state in FIG. 6A. Specifically, the engaging portion 223c and the engaging portion 121c are released from the engagement therebetween when the rear ends of the cantilever beams 123a, 123b are pushed downward. Thus, the engaging portion 223c and the engaging portion 121c form a lance structure. In this way, the engagement between the engaging portion 121c and the engaging portion 223c is released, so that the ultrasonic sensor apparatus 100 is now placed in a rotatable state for rotating about the sensing axis.

In the released state of the engaging portion 223c and the engaging portion 121c, the remaining engaging portions 223a, 223b and the engaging portions 121a, 121b are still held in the engaged state. In other words, the movement of the ultrasonic sensor apparatus 100 in the axial direction of the sensing axis is still limited. Thus, as shown in FIG. 7A, in the released state of the engaging portion 223c and the engaging portion 121c, as indicated by the shaded arrow, the ultrasonic sensor apparatus 100 is rotated in a direction of a blank arrow about the sensing axis of the piezoelectric vibrator 102 until the stoppers 125 of the securing base 120 abut against predetermined points of the holding portion 220 of the holding member 200. Thus, as shown in FIG. 7B, the pass-through sections 122a, 122b of the securing base 120 are arranged at the positions of the engaging portions 223a, 223b. Therefore, the engagement between the engaging portions 121a, 121b and the engaging portions 223a, 223b is released, and the ultrasonic sensor apparatus 100 becomes moveable in the axial direction of the sensing axis. Therefore, the three engaged points are all released, and thus the ultrasonic sensor apparatus 100 can be pulled away from the holding portion 220 of the holding member 200 to remove the ultrasonic sensor apparatus 100 from the holding portion 220 of the holding member 200.

As discussed above, with use of the structure (installation structure) for installing the ultrasonic sensor apparatus 100, at the time of removing the ultrasonic sensor apparatus 100 from the holding member 200 (the bumper 300), it is not required to lift all of the multiple engaging portions at once. Thus, the removal of the ultrasonic sensor apparatus 100 is eased. Particularly, in the case where the manual removal of the ultrasonic sensor apparatus 100 is performed by an operator, the ultrasonic sensor apparatus 100 can be removed with a single hand of the operator.

The preferred embodiment of the present invention has been described. However, the present invention is not limited to the above-described embodiment, and the above embodiment can be modified in various ways.

Figure 8:
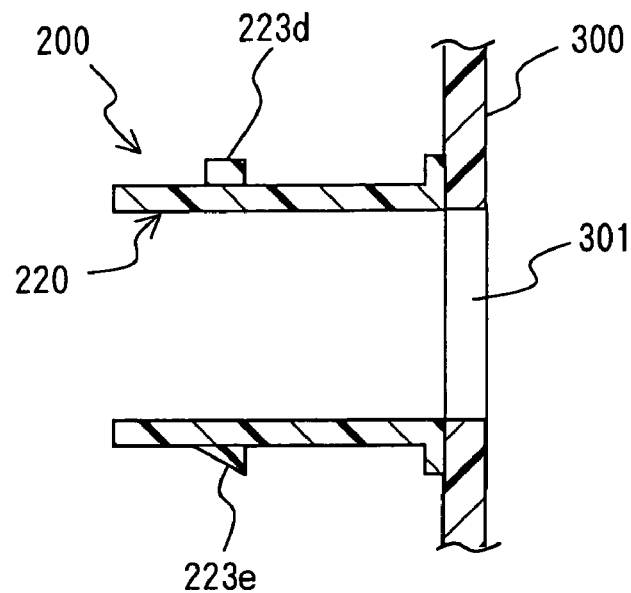
FIG. 8 is a diagram showing a modification of the holding member.

In the above embodiment, the holding member 200, which is used to secure the ultrasonic sensor 100 to the bumper 300, is inserted through the through hole 301 of the bumper 300. Furthermore, the flange portion 210, which is located at the one end of the holding member 200, is engaged with the opening edge on the front surface side of the bumper 300, and the holding portion 220, which is located at the other end of the holding member 200, is inserted through the through hole 301 and is protruded on the rear surface side of the bumper 300. However, the structure of the holding member 200 is not limited to the above one. For example, as shown in FIG. 8, the holding member 200 may be formed of a tubular holding portion 220, which has opposed open ends. One end of the holding portion 220 may be secured to the opening edge of the through hole 301 on the rear surface side of the bumper 300 by, for example, welding, bonding or screwing. FIG. 8 is a diagram showing the modification of the holding member 200, and numerals 223d, 223e indicate engaging portions, which are engaged with the engaging portions of the ultrasonic sensor apparatus 100 in a manner similar to the one discussed above.

Figure 9:
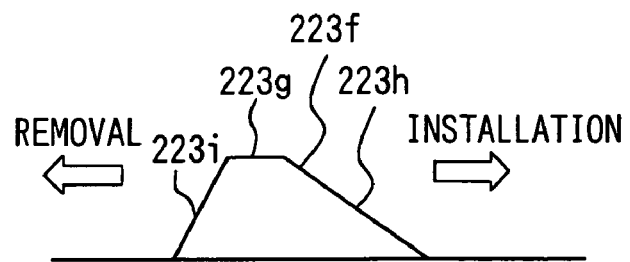
FIG. 9 is a diagram showing a modification the engaging portion of the holding member.

In the above embodiment, all of the engaging portions 223a-223c are made as the one-way snap fit fasteners, which can be easily assembled. Furthermore, among the engaging portions 223a-223c and the engaging portions 121a-121c, only the engaging portion 223c and the engaging portion 121c are formed to have the lance structure, which can be released by simply pushing it. The remaining engaging portions 223a, 223b and the engaging portions 121a, 121b are constructed to be released by rotating the ultrasonic sensor apparatus 100 upon the release of the lance structure. However, besides the above structure, the removal of the ultrasonic sensor apparatus 100 can be facilitated through use of any other appropriate structures. For example, at least one of the engaging portions 223a-223c may have a two-way snap fit faster indicated by numeral 223f in FIG. 9 to engage with a corresponding one of the engaging portions 121a-121c. The two-way snap fit faster 223f is slanted from a radially outer top 223g toward both the leading end and trailing end of the two-way fastener 223f to have a leading side slant surface 223h and a trailing side slant surface 223i. The two-way snap fit fastener is easy to engage and is also easy to release. For example, at the time of releasing the engagement of the engaging portions 223a-223c, each of which has the two-way snap fit fastener, relative to the engaging portions 121a-121c, it is only required to pull the engaging portions 223a-223c with a predetermined load.

Specifically, in place of the above structure, each of the engaging portions 223a, 223b, which are released by the rotational movement of the ultrasonic sensor apparatus 100, may have the two-way snap fit fastener. In such a case, at the time of removing the ultrasonic sensor apparatus 100, the rotational movement of the ultrasonic sensor apparatus 100 may be eliminated.

Further alternatively, all of the engaging portions 223a-223c may have the two-way snap fit fastener. In such a case, the structure can be further simplified. However, in the above case, the rotational movement of the ultrasonic sensor apparatus 100 cannot be limited. Thus, the rotational movement of the ultrasonic sensor apparatus 100 needs to be limited by, for example, the stoppers 125 or the holding portion 220.

Furthermore, in the above embodiment, the engaging portions (female engaging portions) 121a-121c are provided in the housing 101 (the securing base 120) of the ultrasonic sensor apparatus 100, and the engaging portions (male engaging portions) 223a-223c are provided in the holding portion 220 of the holding member 200. However, it is only required that the multiple male engaging portions 223a-223c are provided in one of the housing 101 and the holding member 200, and the multiple female engaging portions 121a-121c, which correspond to the male engaging portions 223a-223c, are provided in the other one of the housing 101 and the holding member 200.

Additional advantages and modifications will readily occur to those skilled in the art. The invention in its broader terms is therefore not limited to the specific details, representative apparatus, and illustrative examples shown and described.

What is claimed is:

1. An ultrasonic sensor assembly that is installable to a through hole of an installation object, which extends from a first surface to a second surface of the installation object, the ultrasonic sensor assembly comprising:

an ultrasonic sensor apparatus that includes a sensor arrangement and a housing, wherein the sensor arrangement is held by the housing and is received in the through hole of the installation object upon installation of the ultrasonic sensor assembly to the installation object; and a holding member that holds the ultrasonic sensor apparatus relative to the installation object, wherein:

the holding member is configured such that at least a portion of the holding member protrudes from the second surface of the installation object upon installation of the holding member to the installation object;

one of the housing of the ultrasonic sensor apparatus and the holding member includes a plurality of first side engaging portions and at least one pass-through portion;

the other one of the housing of the ultrasonic sensor apparatus and the holding member includes a plurality of second side engaging portions, which are engaged with the plurality of first side engaging portions, respectively, upon installation of the ultrasonic sensor apparatus to the holding member;

a first one of the plurality of first side engaging portions and a corresponding first one of the plurality of second side engaging portions limit both an axial movement and a rotational movement of the ultrasonic sensor apparatus relative to the holding member when the first one of the plurality of first side engaging portions is engaged with the corresponding first one of the plurality of second side engaging portions in a first angular position of the ultrasonic sensor apparatus upon the installation of the ultrasonic sensor apparatus to the holding member;

the first one of the plurality of first side engaging portions and the corresponding first one of the plurality of second side engaging portions are disengageable from one another in the first angular position of the ultrasonic sensor apparatus;

the rest of the plurality of first side engaging portions and the rest of the plurality of second side engaging portions limit the axial movement of the ultrasonic sensor apparatus relative to the holding member when the rest of the plurality of first side engaging portions is engaged with the rest of the plurality of second side engaging portions in the first angular position of the ultrasonic sensor apparatus upon the installation of the ultrasonic sensor apparatus to the holding member;

each of the at least one pass-through portion is positioned next to a corresponding one of the rest of the plurality of first side engaging portions in a circumferential direction of the ultrasonic sensor apparatus; and the rest of the plurality of first side engaging portions and the rest of the plurality of second side engaging portions are disengageable from one another at a second angular position of the ultrasonic sensor apparatus, which is spaced from the first angular position in the circumferential direction of the ultrasonic sensor apparatus, to enable the axial movement of the ultrasonic sensor apparatus relative to the holding member in such a manner that each of the rest of the plurality of second side engaging portions passes through a corresponding one of the at least one pass-through portion.

2. The ultrasonic sensor assembly according to claim 1, wherein:

one of the first one of the plurality of first side engaging portions and the corresponding first one of the plurality of second side engaging portions is located radially outward of the other one of the first one of the plurality of first side engaging portions and the corresponding first one of the plurality of second side engaging portions and is held in a first end of at least one resiliently deformable beam, which is joined to a corresponding one of the housing of the ultrasonic sensor apparatus and the holding member; and the first one of the plurality of first side engaging portions is disengaged from the corresponding first one of the plurality of second side engaging portions in the first angular position of the ultrasonic sensor apparatus by radially inwardly pushing a second end of the at least one resiliently deformable beam to radially outwardly displacing the one of the first one of the plurality of first side engaging portions and the corresponding first one of the plurality of second side engaging portions from the other one of the first one of the plurality of first side engaging portions and the corresponding first one of the plurality of second side engaging portions.

3. The ultrasonic sensor assembly according to claim 1, wherein:

the housing of the ultrasonic sensor apparatus includes a securing base, which is located radially outward of the sensor arrangement and projects from the housing of the ultrasonic sensor apparatus in a direction generally parallel to the sensor arrangement; and the plurality of first side engaging portions or the plurality of second side engaging portions is provided in the securing base.

4. The ultrasonic sensor assembly according to claim 1, wherein the holding member is secured to the second surface of the installation object around a peripheral edge of the through hole of the installation object upon the installation of the holding member to the installation object.

5. The ultrasonic sensor assembly according to claim 1, wherein:

the holding member includes:

a flange portion, which is secured to the first surface of the installation object around a peripheral edge of the through hole of the installation object upon the installation of the holding member to the installation object;

a holding portion, which is connected to the flange portion and extends through the through hole of the installation object upon the installation of the holding member to the installation object, so that the holding portion engages an inner peripheral surface of the through hole, and the holding portion projects from the second surface of the installation object; and a claw, which is slanted from an insertion end thereof toward a projection apex thereof; and the flange portion and the claw cooperate together to clamp the installation object therebetween upon the installation of the holding member to the installation object.

6. The ultrasonic sensor assembly according to claim 5, wherein:

the balding portion includes an arch-shaped section, which has:

a plurality of protrusions that axially protrude from the flange portion and extend through the through hole of the installation object to protrude front the second surface of the installation object upon the installation of the holding member to the installation object; and a bridge that bridges distal ends of the plurality of protrusions in such a manner that the bridge is exposed from the through hole of the installation object at the second surface of the installation abject upon the installation of the holding member to the installation object; and the claw is fanned in the bridge.

7. The ultrasonic sensor assembly according to claim 1, wherein the installation object is a bumper of a vehicle.

* * * * *